UNITED STATES PATENT OFFICE.

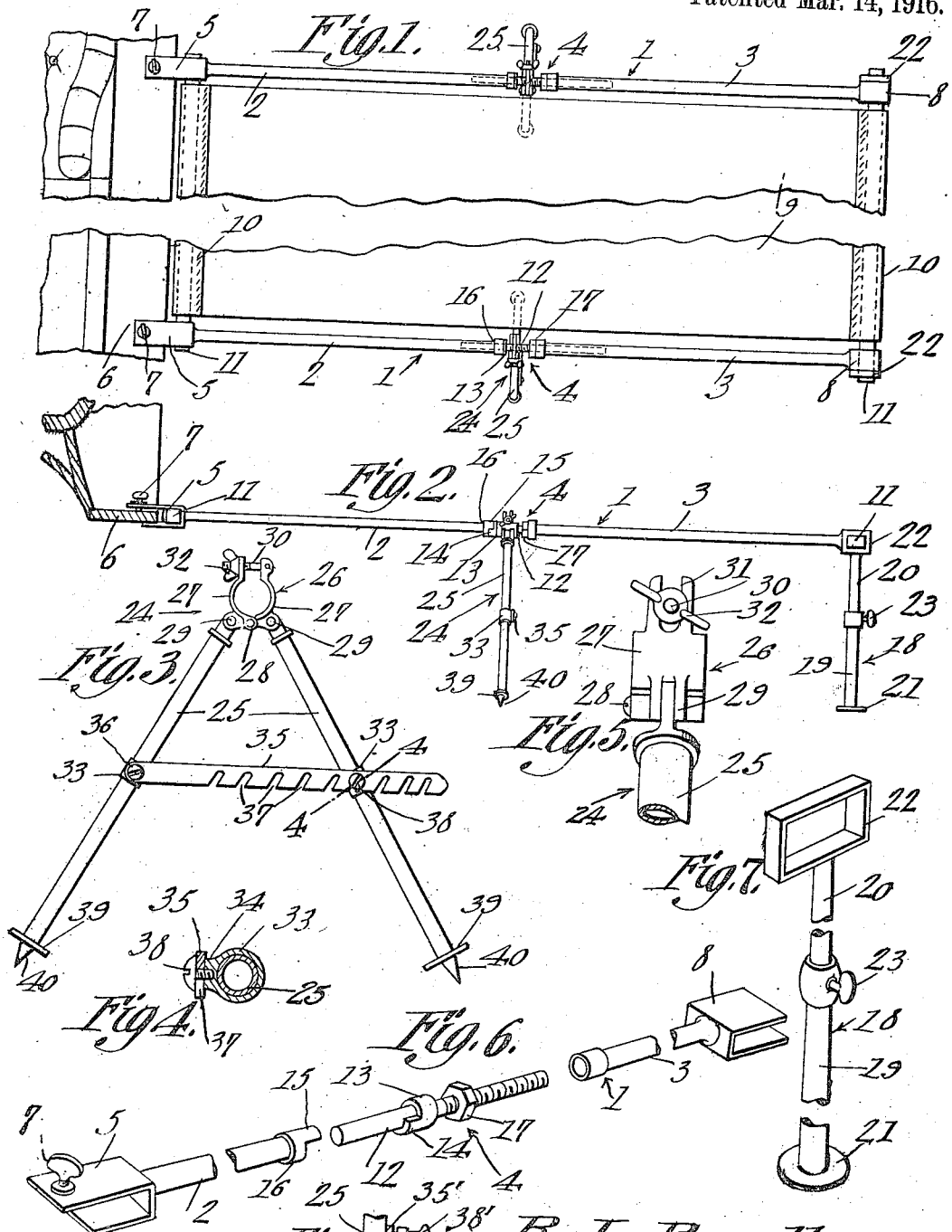
R. L. BRADLEY.
AUTOMOBILE BED.
APPLICATION FILED JAN. 18, 1915.
1,174,964.
Patented Mar. 14, 1916.
R. L. Bradley, Inventor

RALPH L. BRADLEY, OF STEILACOOM, WASHINGTON.

AUTOMOBILE-BED.

1,174,964. Specification of Letters Patent. Patented Mar. 14, 1916.

Application filed January 18, 1915. Serial No. 2,936.

*To all whom it may concern:*

Be it known that I, RALPH L. BRADLEY, a citizen of the United States, residing at Steilacoom, in the county of Pierce and State of Washington, have invented a new and useful Automobile-Bed, of which the following is a specification.

The present invention appertains to an automobile bed, and is particularly an improvement over the automobile beds or stretchers disclosed in my Patents Nos. 1,082,223 and 1,134,312, issued December 23, 1913 and April 6, 1915, respectively.

It is the object of this invention, to provide an attachment for automobiles, or other vehicles and conveyances, whereby when the attachment is set up and applied, it will provide a bed or stretcher for camping, hospital, or other purposes, and the attachment being such that it may be readily collapsed and stored or carried within a space of small encompass.

Another object of the invention is to provide a collapsible bed of the nature indicated, embodying a unique assemblage or combination of the component parts, whereby they may be readily assembled and set up, as well as being readily detached or separated, and whereby the bed may be adjusted for rendering the apron or fabric sheet taut or slack.

Another object of the present invention is to provide novel means for adjustably supporting the frame of the bed attachment, one end of the frame being provided with means for attachment to the running board of an automobile, or a similar support, whereby the running board or support may be utilized as the head of the bed.

It is also within the scope of the invention, to provide a bed attachment of the nature indicated, which is improved generally in its construction and details, to enhance the utility thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in its preferred embodiment, in the accompanying drawing, wherein—

Figure 1 is a plan view of the bed in erected condition and applied to the running board of a motor vehicle, portions being broken away. Fig. 2 is a side elevation of the device. Fig. 3 is an enlarged elevation of one of the adjustable center supports. Fig. 4 is an enlarged sectional detail taken on the line 4—4 of Fig. 3. Fig. 5 is an enlarged elevation of the clamp of the adjustable support illustrated in Fig. 3. Fig. 6 is an enlarged perspective view of one of the side rails of the frame, illustrating the parts thereof separated, and portions being broken away. Fig. 7 is an enlarged perspective view of one of the supporting legs or standards for the foot end of the bed, parts being broken away. Fig. 8 is a fragmental detail illustrating a modification.

In carrying out the invention, there is provided a pair of longitudinal side rails 1, forming the side members of the bed frame, and each comprising a pair of alining tubular sections 2 and 3, and an intermediate coupling and adjusting device 4 between the sections 2 and 3.

Those ends of the sections 2 remote from the sections 3, are provided with forks 5 adapted to straddle or engage the running board 6 of an automobile, or other similar supports, whereby the running board or support 6 will serve as the head of the bed, and will also carry the corresponding end of the bed frame. The pillows may thus be placed upon the running board or support 6, since the running board or support 6 forms an extension of the bed provided by the present attachment. Thumb screws 7 are carried by the forks 5 for clamping the running board or support 6 within the forks 5, to firmly attach the side rails 1 to the running board.

Those ends of the tubular sections 3 of the rails 1, remote from the sections 2, or at the foot end of the bed, are provided with forks 8 for coöperation with the forks 5 at the head end of the bed, to support the apron or sheet 9 of canvas or other fabric, which is disposed longitudinally between the side rails 1. The ends of the apron 9 are provided with hems 10 through which the cross bars 11 are passed, the cross bars 11 forming the end members of the bed frame, and having their ends extended beyond the side edges of the apron 9 to be received by the respective forks 5 and 8. Thus, the apron 9 will be held between the cross or end bars 11, and may yield between the side rails 1, for the comfort of the occupant or occupants of the bed. The forks 5 thus serve the dual functions, of providing means for engaging the running board or support 6, and for receiving and holding the ends of the cross bar 11 at the head of the bed.

The intermediate coupling and adjusting device 4 of each rail 1, embodies a rod 12 of suitable length, which is adapted to be telescoped or slipped into the adjacent ends of the rail sections 2 and 3, for holding the rail sections substantial and to prevent the buckling or excessive bending thereof. A collar 13 is secured in any suitable manner upon the rod 12 and is adapted to abut against the end of the tubular section 2, the collar 13 being provided with an arcuate lip or portion 14 to overlap the arcuate lip or portion 15 of a collar 16 secured upon the end of the section 2, whereby when the rod 12 is inserted into the section 2, the lips 14 and 15 overlapping will hold the rod 12 against rotatory movement. A nut 17 is threaded upon the rod 12 to abut or bear against the end of the tubular section 3, the tubular section 3 being slidable upon the corresponding end portion of the rod 12, whereby the nut 17 may be threaded or adjusted upon the rod 12 for separating the rail sections 2 and 3, so that the apron 9 may be stretched and rendered taut.

A pair of corner legs or standards 18 are provided for the foot end of the bed frame remote from the running board or support 6, and each of the legs or standards 18 is extensible, and comprises telescoping sections 19 and 20. The lower outer tubular section 19 is provided at its lower end with a base plate or foot 21 to rest upon the soil or other underlying surface, for properly supporting the leg 18. The upper end of the upper telescoping section 20 is provided with a rectangular loop 22 adapted to be slipped over the end of the cross bar 11 at the foot end of the bed. A set screw 23 is carried by the upper end of the section 19 for binding or clamping the section 20 in any adjusted position, it being noted that the legs or standards 18 are adjustable to various heights, in order that the bed 9 may be supported at a horizontal position even though the running board or support 6 may be spaced more or less from the ground or underlying surface, and even though the ground or underlying surface may be on an incline. The legs 18 are thus designed to support the corresponding cross bar 11 and adjacent ends of the side rails 1.

An adjustable support 24 is provided for the central or intermediate portion of each side rail 1, and comprises a pair of downwardly diverging legs 25 having their upper ends connected to a clamp 26. The clamp 26 is adapted to embrace or engage the central or intermediate portion of the rod 12 of the corresponding rail 1, between the collar 13 and nut 17 thereof, to attach the legs 25 to the central or intermediate portion of the rail. The clamp 26 embodies a pair of arcuate sections or jaws 27 hinged at their lower ends, as at 28, the lower end portions of the sections or jaws 27 and the upper ends of the legs 25 having overlapped and pivotally connected ears, as at 29, whereby the legs 25 are pivoted to the clamp to swing relative thereto. A screw 30 is pivoted to the upper or free end of one jaw or section 27 of the clamp, and the upper or free end of the other clamp section or jaw 27 is provided with an open slot 31 for receiving the screw 30, a thumb or wing nut 32 being threaded upon the screw 30 to bear or seat against the slotted end of the respective clamp section or jaw, so that when the nut 32 is tightened, the clamp 26 will be made to embrace the corresponding rod 12 tightly, to firmly attach the support 24 to the respective rail.

Each of the supports 24 embodies an adjustable device, for holding the legs 25 at various angles relative to one another, whereby the legs 25 may accommodate uneven ground or supporting surfaces, and whereby the support 24 may be adjusted to hold the corresponding rail 1 at various heights. To this end, sleeves or collars 33 are secured upon the legs 25 intermediate their ends, and are provided with bosses 34 at one side of the legs 25. A brace 35, formed from a bar or strip of metal, is pivoted at one end, as at 36, to the boss 34 carried by one leg, and the lower edge of the brace 35 is provided with a longitudinal series of open slots or notches 37, which are preferably inclined, as seen in Fig. 3. A screw or similar element 38 is threaded into the boss 34 of the other leg 25, and is designed for the engagement of the notches or slots 37 of the brace 35, whereby the brace may be engaged between the head of the screw 38 and the adjacent boss 34, and in this manner, the brace 35 may be adjusted to hold the legs 25 apart at various angles relative to one another for the intended purposes.

The lower ends of the legs 25 are provided with flanges 39 for preventing them from sinking into the ground, and are also provided with spurs 40 projecting downwardly from the flanges 39 to prevent the legs 25 from slipping.

From the foregoing, taken in connection with the drawing, it is believed that the capabilities and advantages of the present device will be obvious to those versed in the art, without lengthy description being necessary. The structure may be readily set up by assembling the respective parts one after the other in the proper and obvious order, and conversely, the parts may be readily separated for collapsing and storing the device within a small encompass. When the parts are assembled, the nuts 17 may be rotated for separating the rail sections, to render the apron 9 taut, and for collapsing the device, the nuts 17 may be threaded to enable the apron 9 to be slackened, so that the parts can be readily separated. The present structure will be rigid or substantial when erected, with the supporting members properly adjusted, and if desired, a suitable tent, covering, or canopy may be employed in connection with the bed for protecting the occupant or occupants from the elements. The present device is intended to be carried by the motor vehicle, so that it may be readily set up when circumstances render it desirable, or the device may be employed on steam boats, or other vehicles or conveyances, for kindred purposes.

In Fig. 8, a modified form of means is illustrated for adjustably clamping the brace or strip 35' to the leg 25 of the intermediate support. Thus, the collar 33' which is secured upon the leg 25 is provided with an upstanding arm or bracket 34' through which a thumb screw 38' is threaded for clamping the brace or strip 35' against the leg 25. Thus, the brace 35' need not be provided with the notches 37 illustrated in Fig. 3.

Having thus described the invention, what is claimed as new is:

1. A bed for attachment to a running board or similar support, comprising a frame including extensible side rails having terminal forks, and cross bars terminally engageable in said forks, the forks at one end of the frame being adapted to engage a running board or similar support and having means for clamping the same, legs having upper loops adapted to be slipped over the ends of the cross bar at the other end of the frame, and an apron terminally attached to the cross bars.

2. A bed attachment for automobiles, embodying a pair of side rails each embodying a pair of sections and an intermediate rod telescoped into the adjacent ends of the sections, a nut threaded upon each rod and bearing against one of the respective rail sections, said rods and other rail sections having interengageable means for preventing the rotation of said rods, cross bars, the terminals of said rails having portions receiving said cross bars, the rails having means at one end for engaging a running board or similar support, adjustable legs for supporting the other ends of the rails, an apron terminally attached to the cross bars, and adjustable legs engageable with said rods for supporting the intermediate portions of the rails.

In testimony that I claim the foregoing as my own, I have hereto affixed my signature in the presence of two witnesses.

RALPH L. BRADLEY.

Witnesses:
G. R. McDONALD,
Mrs. G. R. McDONALD.